United States Patent [19]

Trimble

[11] Patent Number: 5,403,028
[45] Date of Patent: Apr. 4, 1995

[54] DRIVE WHEEL SUSPENSION SYSTEM FOR HUMAN POWERED VEHICLE

[76] Inventor: Richard H. Trimble, P.O. Box 60656, Florence, Mass. 01060

[21] Appl. No.: 56,406

[22] Filed: May 4, 1993

[51] Int. Cl.⁶ .................. B62K 25/28; B60G 11/27
[52] U.S. Cl. ................................ 280/284; 280/283; 280/288; 280/275; 280/711
[58] Field of Search ................ 280/283–286, 280/288, 288.3, 275, 281.1, 711, 713, 712

[56] References Cited

U.S. PATENT DOCUMENTS

| | | |
|---|---|---|
| 90,273 | 6/1869 | Buell . |
| 392,523 | 11/1888 | Owen .................. 280/284 |
| 401,237 | 4/1889 | Woodward . |
| 404,693 | 6/1889 | Easthope . |
| 443,266 | 12/1890 | Bell . |
| 564,319 | 7/1896 | Travis . |
| 602,034 | 4/1898 | Murphy ................ 280/275 |
| 624,295 | 5/1899 | Carpenter ............. 280/275 |
| 644,957 | 3/1900 | Williams . |
| 721,343 | 2/1903 | Travis et al. . |
| 1,016,042 | 1/1912 | Shelton ................ 280/284 |
| 1,068,583 | 7/1913 | Harley . |
| 1,071,892 | 9/1913 | Diepenhorst et al. . |
| 1,077,105 | 10/1913 | Stewart . |
| 1,333,449 | 3/1920 | Russell . |
| 1,369,356 | 2/1921 | Rigby . |
| 1,580,414 | 4/1926 | Cozzolino et al. ..... 280/275 |
| 1,947,631 | 2/1934 | Whidden . |
| 2,283,671 | 5/1942 | Finlay et al. . |
| 2,446,731 | 8/1948 | Wheler . |
| 2,515,380 | 7/1950 | Pentecost . |
| 2,756,071 | 7/1956 | Riva .................. 280/284 X |
| 3,448,997 | 6/1969 | Kosugi ............... 280/281.1 |
| 3,907,332 | 9/1975 | Richardson .......... 280/285 |
| 3,931,990 | 1/1976 | Knapp ................. 280/283 |
| 3,942,821 | 3/1976 | Bock .................. 280/285 X |
| 3,948,543 | 4/1976 | MacDonald et al. ..... 280/284 |
| 3,974,892 | 8/1976 | Bolger ................ 280/284 X |
| 3,982,770 | 9/1976 | Satoh et al. .......... 280/284 |
| 4,046,396 | 9/1977 | Taylor et al. ......... 280/281.1 |
| 4,076,271 | 2/1978 | Doncque .............. 280/284 |
| 4,114,918 | 9/1978 | Lutz .................. 280/284 |
| 4,378,857 | 4/1983 | Anderson ............. 280/284 X |
| 4,400,003 | 8/1983 | de la Haye ........... 280/281.1 X |
| 4,415,057 | 11/1983 | Yamaguchi ........... 280/284 X |
| 4,463,824 | 8/1984 | Boyesen .............. 280/284 X |
| 4,485,885 | 12/1984 | Fukuchi .............. 280/284 X |
| 4,540,190 | 9/1985 | Moulton .............. 280/281.1 |
| 4,574,909 | 3/1986 | Ribi .................. 280/284 X |
| 4,582,343 | 4/1986 | Waugh ................ 280/284 X |
| 4,596,302 | 6/1986 | Suzuki et al. ......... 280/284 X |
| 4,621,706 | 11/1986 | Boyesen .............. 280/284 X |
| 4,669,747 | 6/1987 | Groendal ............. 280/283 |
| 4,673,053 | 6/1987 | Tanaka et al. ........ 280/284 X |
| 4,732,404 | 3/1988 | Coetzee .............. 280/283 |

(List continued on next page.)

FOREIGN PATENT DOCUMENTS

| | | | |
|---|---|---|---|
| 0423911 | 12/1946 | Italy ................ 280/284 |
| 0426402 | 10/1947 | Italy ................ 280/284 |
| 0435511 | 11/1947 | Italy ................ 280/284 |
| 12901 | of 1887 | United Kingdom . |
| 17080 | of 1887 | United Kingdom . |
| 19032 | of 1890 | United Kingdom . |
| 0259401 | 10/1926 | United Kingdom ..... 280/284 |

Primary Examiner—Karin L. Tyson
Assistant Examiner—F. Zeender
Attorney, Agent, or Firm—Pollock, Vande Sande & Priddy

[57] ABSTRACT

A suspension system for the drive wheel or wheels of a human powered vehicle provides a direct and rigid connection between the mounting of a driving pulley and the mounting of a driven pulley for rotating the drive wheel or wheels. A single and simple pivot junction allows the swing necessary for suspension of a rigid rear triangle carrying both of these mountings. A pressurized gas bag or a spring system is used to provide a biasing force between the rear triangle and a front triangle. This allows the maximum efficient use of human effort and avoids compromising the ideal operator position on the vehicle, as well as providing adjustable shock absorbing capabilities.

22 Claims, 5 Drawing Sheets

U.S. PATENT DOCUMENTS

| | | |
|---|---|---|
| 4,741,517 | 5/1988 | Warmuth, II et al. |
| 4,744,434 | 5/1988 | Miyakoshi et al. ............. 280/284 X |
| 4,786,035 | 11/1988 | Elliott . |
| 4,789,174 | 12/1988 | Lawwill ............................... 280/284 |
| 4,792,150 | 12/1988 | Groendal et al. ............... 280/283 X |
| 4,834,408 | 5/1989 | de Cortanze . |
| 4,856,801 | 8/1989 | Hollingsworth .................... 280/284 |
| 4,951,791 | 8/1990 | Cretzell ............................ 280/284 X |
| 4,997,197 | 3/1991 | Shultz ............................... 280/284 X |
| 5,080,384 | 1/1992 | Groendal et al. ............. 280/281.1 X |
| 5,098,114 | 3/1992 | Jones .................................... 280/284 |
| 5,121,937 | 6/1992 | Lawwill ............................... 280/284 |
| 5,158,733 | 10/1992 | Trimble ....................... 280/281.1 X |
| 5,215,322 | 6/1993 | Enders ......................... 280/281.1 X |
| 5,226,674 | 7/1993 | Buell et al. ........................ 280/284 |
| 5,265,907 | 11/1993 | Tostado .......................... 280/713 X |

DRIVE WHEEL SUSPENSION SYSTEM FOR HUMAN POWERED VEHICLE

FIELD OF THE INVENTION

This present invention relates to a suspension system for the drive wheel or wheels of a human powered vehicle, and more particularly relates to bicycles, tricycles and wheelchairs.

BACKGROUND OF THE INVENTION

Human powered vehicles have long been used as a means of transportation and recreation. However, virtually all human powered vehicles known in the prior art have involved a relatively rigid frame, which transmits directly to a rider the shocks resulting from potholes, rocks and other unevenness in the riding surface. This has resulted in discomfort to the rider which is at least undesirable, if not unacceptable.

The typical solution to this problem found in the prior art has been to include a shock absorbing suspension on the vehicle, similar to those found on motorcycles or on cars. One of the difficulties with nearly all prior art designs is that they absorb a significant amount of driving force which would otherwise provide forward movement. While this loss is not significant for a motorized vehicle, it is undesirable where the only motive force is the muscle power of a human being.

The energy loss referred to results from the fact that in virtually all prior art suspension devices, there is no rigid connective member between the input of the driving force and the driving wheel. As a result of this, the spring or elastic member allowing suspension movement is affected by the input force. This will typically be perceived as the vehicle settling or rising in response to the input force.

The majority of suspension systems for human powered vehicles in the prior art suffer from chain tension induced compression of the suspension. One of the earliest and simplest examples of this type is illustrated in U.S. Pat. No. 564,319 to Travis. In this version, the top run of the chain in tension pulls against the rear wheel axle and the pivot is located below this portion of the chain. The result is that the swing arm is pulled in a direction that compresses the suspension. This action can be identified by the rider as a significant settling or bobbing of the vehicle in response to peddling input. This action is undesirable because a significant portion of the energy normally routed directly to driving the rear wheel is absorbed by the action of compressing the suspension.

Figure 1:
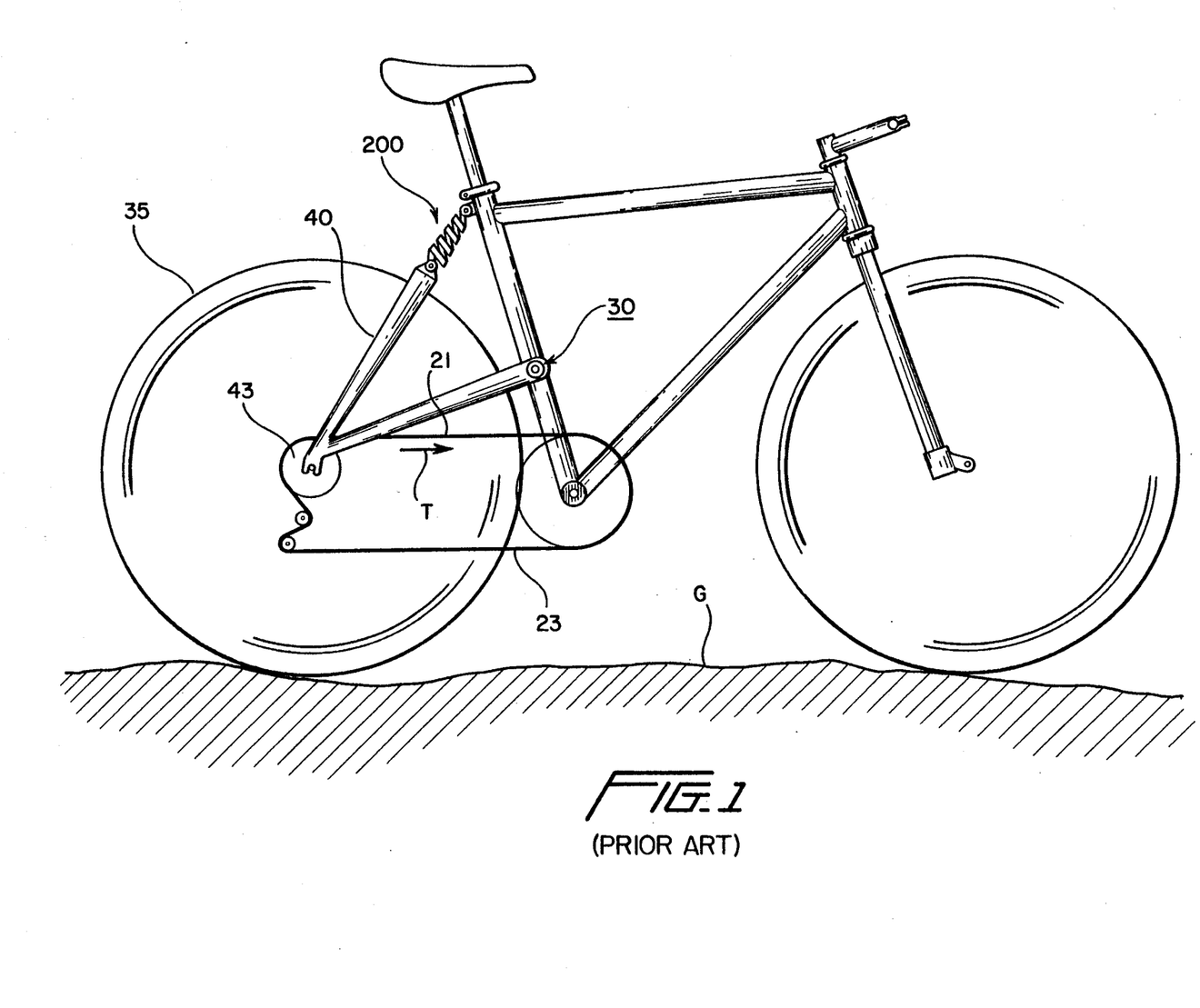
FIG. 1 is a right side elevational view of a prior art suspension known as a high pivot system.

More recent attempts to solve this problem of wasted energy have raised the pivot to a point above the top run of the chain as shown in FIG. 1. These versions suffer from chain tension induced extension of the suspension. The prior art in FIG. 1 shows that when the tensioned top run 21 of chain 23 pulls against rear sprocket 43 and pivot 30 is above chain 23, then chain 23 becomes a means to pull swing arm 40 in the direction of tension force arrow T so as to extend spring suspension 200. This action can be identified by the rider as a significant rising or bobbing of the vehicle relative to ground G in response to pedaling input. This bobbing action is undesirable because a significant portion of the energy ideally routed directly to driving the rear wheel 35 is absorbed by the action of extending the suspension 200.

A further example of the prior art is U.S. Pat. No. 4,789,174 to Lawill, which illustrates a bicycle having a suspension system that is a further attempt to circumvent the problems of chain tension induced actuation thereof. This version comprises an elaborate multi-pivoted interconnection of swing arms, control arms and hub plates configured in a trapezoidal arrangement and connected to a bicycle seat riser tube. If one skilled in the art studies this system closely, it becomes apparent that this system does not completely eliminate chain tension induced actuation of the suspension, and instead adds unnecessary complexity to the suspension system, thereby dictating structural, maintenance, manufacturing and weight compromises.

Another version known in the art is illustrated in U.S. Pat. No. 4,669,747 to Groendal. While this design may overcome the problem of chain tension induced actuation, it has other flaws which render it unacceptable. For example, this bicycle frame provides almost no suspension to the seat. The shock from a bump in the riding surface travels directly up from the rear axle and through the frame to the seat. Further problems with this design are apparent upon application of the front brake. A hard braking force at the front wheel causes the wheelbase of the frame to shorten, the cable goes slack, and a completely unacceptable "wind-up" of the top tube occurs.

This braking problem is only partially overcome in the more modern version shown in U.S. Pat. No. 5,080,284 to Groendal, et al. This design suffers from an unacceptable shortening and lengthening of the rider position. As the suspension reacts to a bump in the riding surface, the handlebars move closer to the saddle, thus compromising the ideal riding position of the rider.

While there are some other versions of suspension systems which do not have the problem of chain tension induced actuation, they also compromise the shock absorbing capabilities of the frame design and provide inferior performance. For example, some frames suspend the bicycle seat only, rendering the shock absorbing capabilities ineffective whenever the rider stands.

There is therefore a need for a suspension system which transforms substantially all of the driving force into forward motive force without substantial loss in the level of suspension and/or compromising the ideal rider position.

SUMMARY OF THE INVENTION

The present invention provides an improved suspension system for the drive wheel or wheels of human powered vehicles. Due to the extremely limited amounts of power available from the human body, many features of vehicle design considered insignificant in motorized vehicles, become critically important in human powered vehicles. Energy loss, no matter how subtle, is undesirable. Similarly, the weight of the vehicle becomes much more important than in most other suspended vehicles which are generally motorized.

It is therefore a principal object of the present invention to provide a suspension system in which substantially all of the driving forces are available for forward movement, rather than significant portions thereof being lost in the suspension system.

It is another object of the present invention to provide a simple but efficient suspension system which is durable, easy to manufacture and maintain, and is as light in weight as possible.

These and other objects are achieved by the human powered vehicle of the invention which has a frame comprising a seat frame section for supporting at least one seat on which a human being may sit and at least one freely rotatable wheel, a drive frame section for rotatably supporting at least one drive wheel, pivot means for pivotally connecting together the seat frame section and the drive frame section for pivotal movement therebetween about a pivot axis in response to a human being seated on the seat, and biasing means connected between the seat section and drive section for providing a biasing force to resist such pivotal movement. The drive frame section comprises a first portion with first means for securing the drive frame section to the pivot means, a second portion with second means for mounting a drive wheel assembly having driven means for causing the drive wheel to rotate around a rotational axis, and a third portion with third means for mounting driving means to which human power may be applied for causing transmission means to transmit a driving force from said driving means to said driven means so that the drive wheel is rotated by this force.

The first, second and third portions of the drive frame section are rigidly connected to each other in a triangular relationship such that the third means of the drive frame section is below a line passing through both the pivot axis between the seat and drive frame sections and the rotational axis of the drive wheel. In the preferred embodiment, the driving means comprises a driving pulley means, the driven means comprises a driven pulley means, and the transmission means comprises a flexible driving element which extends between and is engaged by the driving pulley means and the driven pulley means, respectively. The flexible driving element includes a run which is tensioned by a tension force applied in a tension direction by the driving pulley means, this tension direction being generally tangented to the perimeter of the driving pulley means at a position below the line passing through the rotational axis of the drive wheel and the pivot axis between the seat and drive frame sections such that the tension force offsets by a substantial amount a pedal force generated by the downward power stroke of a human being applied to a pedal element of the driving pulley means.

BRIEF DESCRIPTION OF THE DRAWINGS

These and other objects of the invention may be better understood from the following detailed description of the invention, taken together with the accompanying drawings in which.

DETAILED DESCRIPTION OF THE PREFERRED EMBODIMENT

Figure 2:
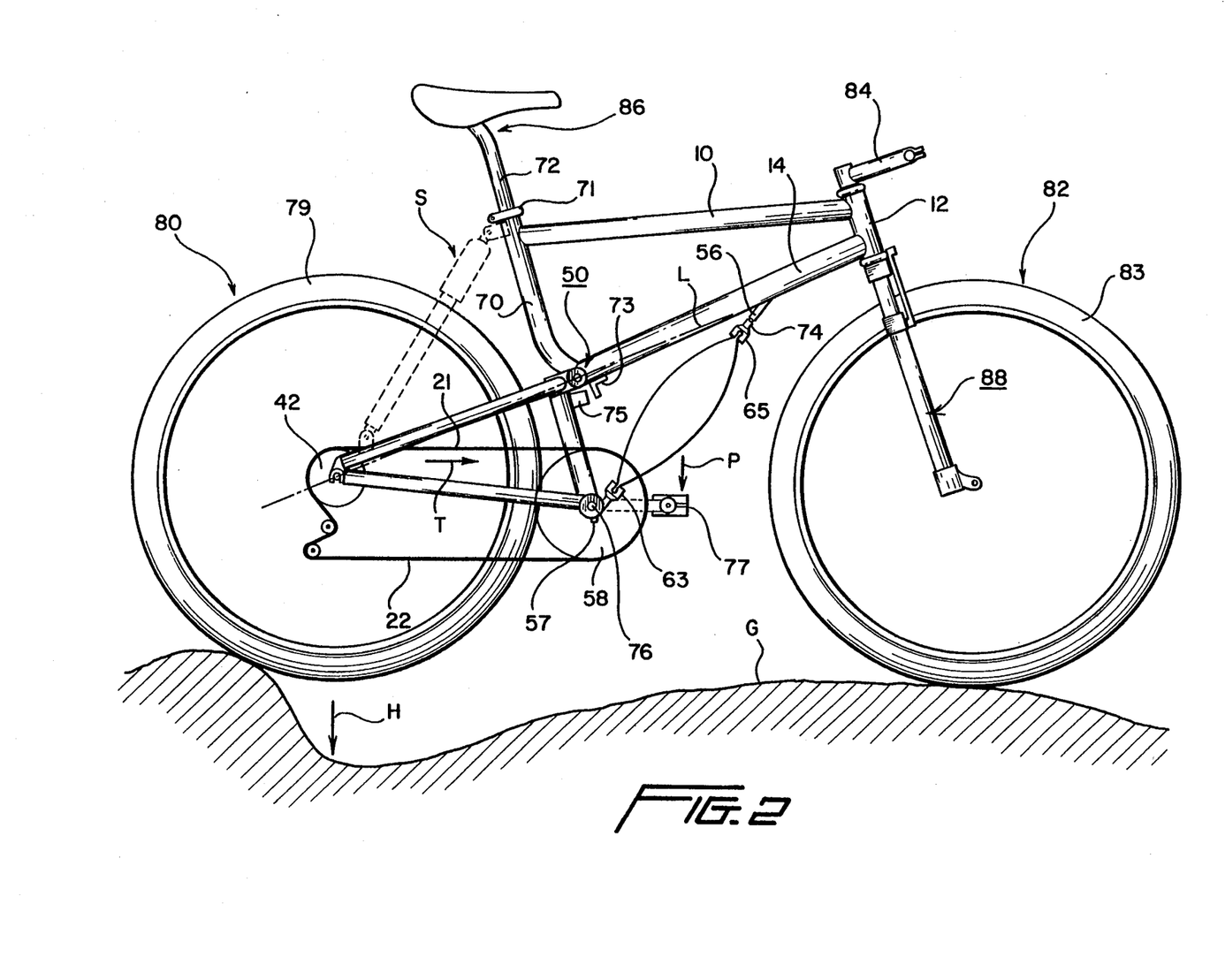
FIG. 2 is a right side elevational view of one embodiment of the present invention.
Figure 3:
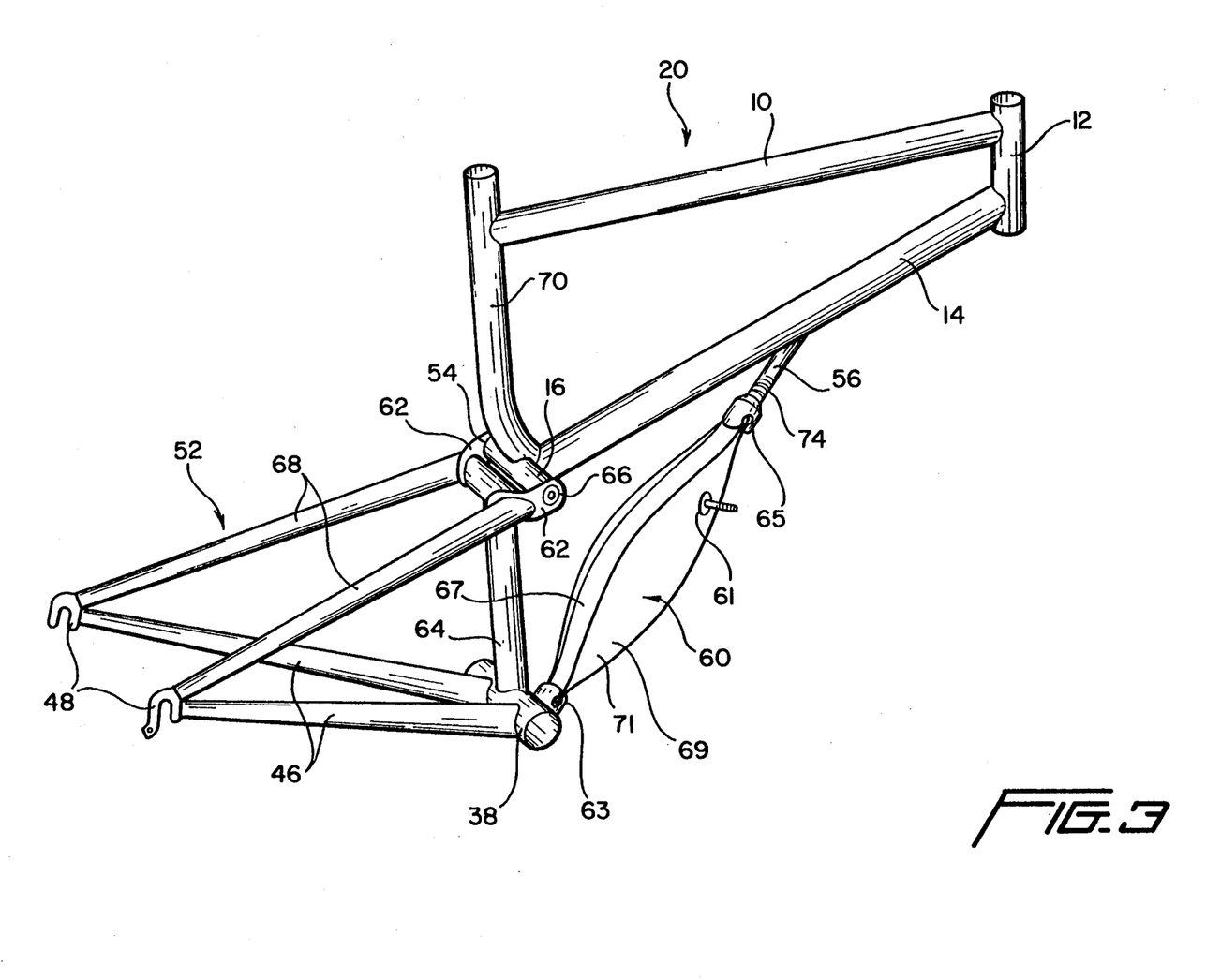
FIG. 3 is a right side perspective view of the frame and rear wheel suspension system of the embodiment of FIG. 2.

FIGS. 2 and 3 show an improved suspension system according to the invention as embodied in a bicycle frame. The frame is composed of two separate and distinct sections, namely, a front triangle seat section 20 and a rear triangle drive section 52. The two frame triangles are connected together at a pivot junction 50 having two rotatable pivots 54 and 66.

The front triangle section 20 is composed of a top tube 10, a head tube 12, a down tube 14, a pivot tube 16, an upper threaded bag mounting stub 56, an extension limit stop 73, and a seat riser tube 70. The seat tube 70 provides means, including a clamp 71, for adjustably clamping a seat post 72 of seat assembly 86 in a conventional manner. The head tube 12 provides means to mount a front fork assembly 88, preferably of the suspension type, in a conventional manner. Fork assembly 88 provides a means to mount front wheel assembly 82 using a front suspension component having the elements shown in FIG. 5. Wheel assembly 82 includes a freely rotatable wheel 83. Fork 88 also provides means to mount handlebar assembly 84 in a manner commonly practiced in the art.

The rear triangle section 52 is composed of a pair of seat stays 68, a pair of pivot mounting tabs 62, a connector tube 64, a bottom bracket shell 38, a lower threaded bag mounting stub 57, a pair of chain stays 46, an extension limit stop 75, and a pair of rear wheel dropouts 48 for mounting rear wheel assembly 80. Wheel assembly 80 includes a drive wheel 79.

Close examination of FIGS. 2 and 3 reveals that the rear triangle 52 is a rigid connecting member for connecting the rear wheel assembly 80 to the front triangle 20. All of the parts of the rear triangle 52 are permanently and rigidly fastened together to form a triangularly braced structure. The front sprocket 58, rear sprocket 42, chain 22, rear wheel assembly 80 and related parts of the propulsion and drive system are carried by the rear triangle 52 and are mounted thereon in a conventional manner. Front sprocket 58 serves as part of a driving pulley means and rear sprocket 42 serves as part of a driven pulley means. This triangular drive frame section is pivotally connected to the front triangle 20 at the pivot junction 50 comprising rotatable pivot connections 54 and 66. Extension limit stops 73 and 75 keep the drive frame section 52 from over extending forwardly (counterclockwise) when a negative (reverse) load is applied to the vehicle in the direction of arrow H, such as when the bicycle becomes airborne after hitting a bump.

A tension biasing means comprises a gas bag assembly 60 which is connected via corresponding swivels 63 and 65 to a threaded socket in the stub 56 on the front triangle and to a threaded socket in the stub 57 on the rear triangle. The gas bag or bags of assembly 60 are preferably made of a resilient material, such as a synthetic rubber, and are inflatable with a pressurized gas, such as air, by means of a valve 61. The gas bag assembly 60 may be replaced or supplemented by spring means, such as by a coil spring as described in more detail below, or by a pair of leaf springs (not shown) having a shape similar to that of the strap 67 shown in FIG. 4.

Figure 4:
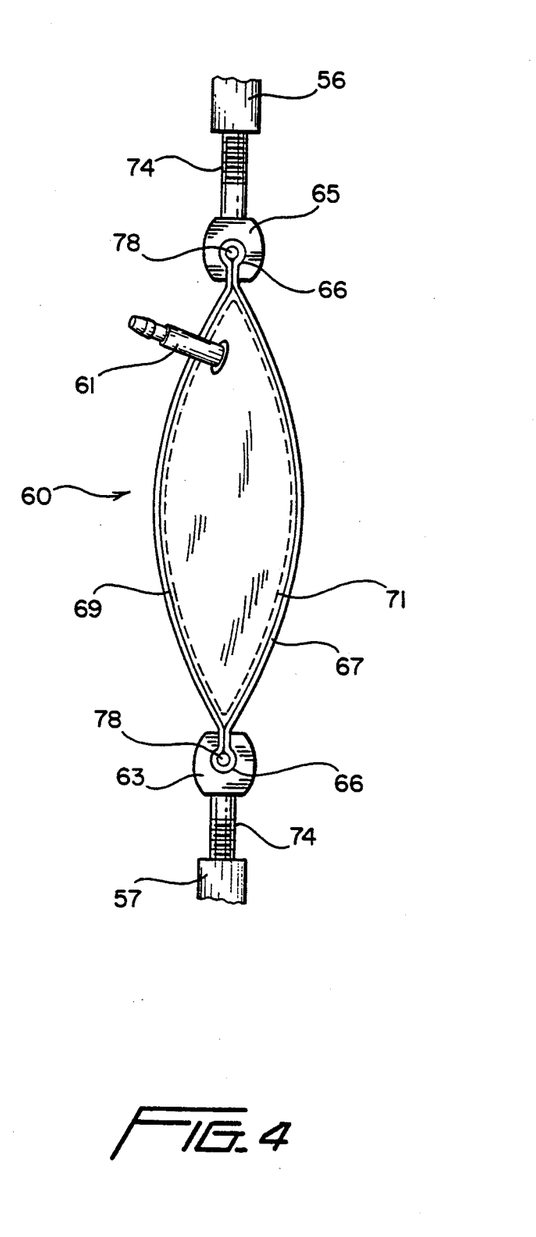
FIG. 4 is an enlarged fragmentary view of the gas bag component of the embodiment of FIG. 2.

Gas bag assembly 60 is composed of threaded attachment swivels 63 and 65, a continuous webbing strap 67, an outer gas bladder 69, an inner gas bladder 71 and a valve 61 as best shown in FIG. 4. Attachment swivels 63 and 65 provide a means to mount the bladders in a fashion so that tension can be provided by gas bag assembly 60 to bias the front and rear wheel assemblies toward each other and to resist clockwise rotation (as viewed from the right side) of the rear triangle 52 toward the seat assembly 86 in response to the weight of the bicycle rider. The threaded shanks 74 of attachment swivels 63 and 65 also provide a means to modify the overall length of gas bag assembly 60, and thereby change the tension force thereof. The swivels 63 and 65 also have a cavity 66 for receiving a pin 78 and a loop portion of strap 67 to provide means for capturing the ends of webbing strap 67.

Webbing strap 67 provides a means to exert external pressure on outer gas bladder 69 when this strap is placed in tension. Inner bladder 71 ensures an airtight seal to contain the pressurized gas while outer bladder 69 provides a reinforcing second layer of resilient material. Valve 61 allows for the introduction of compressed gas into inner bladder 71, as well as for the venting of this gas. Adjustment of gas pressure in gas bladder 71 allows for modulation and control of the biasing force provided by strap 67 in response to this gas pressure. Biasing forces appropriate to users of different weights can be obtained by this modulation. A stiffer or more resilient feel to the suspension can also be obtained by adjustment of gas pressure.

In addition, a supplemental biasing assembly S may be provided between the seat riser tube and one or both of the seat stays as illustrated by broken lines in FIG. 2. Assembly S may be any one of the alternative spring systems illustrated in FIGS. 6–8.

Figure 5:
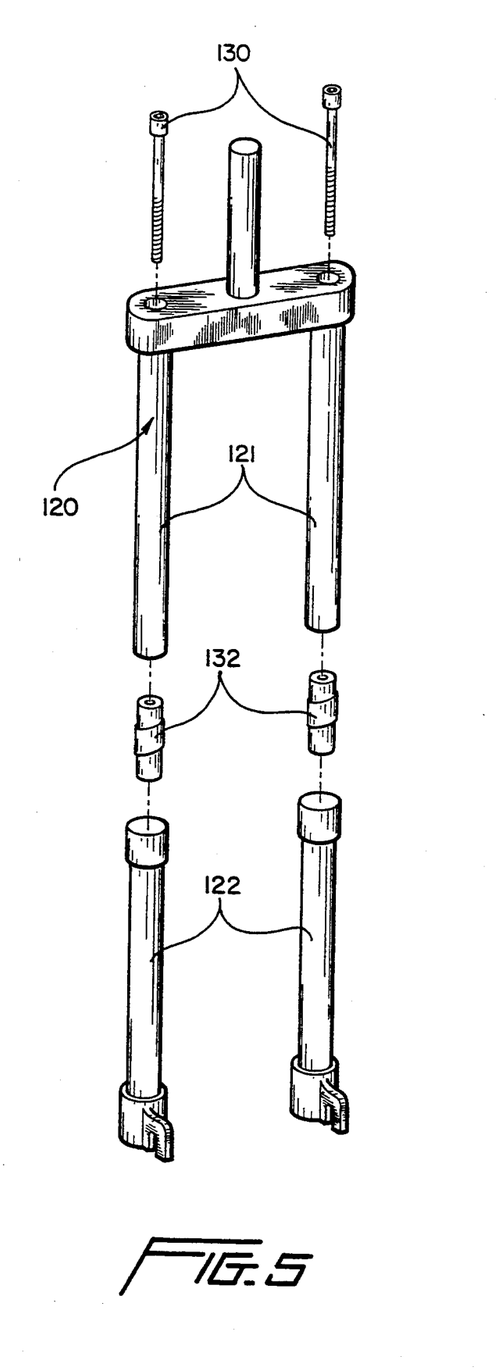
FIG. 5 is an exploded view illustrating components of the front wheel suspension component of the embodiment of FIG. 2.

As shown in FIG. 5, front fork assembly 88 is composed of a leg and crown assembly 120 having legs 121, a slider and dropout assembly having tubes 122, extension limit bolts 130, and elastomer cylinders 132. This assembly provides one means for suspension of the front wheel. The front suspension action is accomplished when slider tubes 122 slide over legs 121 and capture and compress elastomer cylinders 132 against the solid lower ends of legs 121. Extension limit bolts 130 keep legs 121 from separating from slider tubes 122 when a negative (reverse) load is applied to the suspension.

As the rear triangle 52 swings through its travel, the entire drive system moves as one unit. In addition, the rotational axis of pedal crank 76 is below a line L which passes through the rotational axis of the rear wheel and the pivot axis of pivot junction 50. The great advantage of this arrangement is particularly made clear when examining the forces acting on the chain 22. Pedaling forces P cause the top run of the chain 22 to be drawn tight. This is the previously mentioned chain tension T which on the prior art suspension systems causes unwanted actuation of the rear suspension system.

With the present invention, however, as shown in FIG. 2, application of the tension force T to the top run of chain 22 will have a substantially reduced effect on the gas bag assembly or other biasing means 60 because the torque generated around pivot junction 50 by tension force T is offset entirely, or at least to a significant extent, by the torque generated around pivot junction 50 by the pedaling force P applied by the rider to the pedal 77 during its forward power arc as illustrated in FIG. 2. In other words, since the rear triangle 52 is entirely rigid and front sprocket 58 and rear sprocket 42 always move together, the pedaling force P is counteracted by tension force T in the top run of chain 22 to reduce or eliminate actuation of biasing means 60 by either of these forces. Preferably, only the weight of the rider or a bump in the riding surface G will actuate the biasing means 60.

The rigidly mounted drive train of the current invention also provides a number of additional advantages because conventional drive trains are designed to work with a constant chain length without significant slack, such as the slack generated by unwanted actuation of prior art rear suspension systems. Thus, with the present invention, the rear derailleur does not have to take up excessive slack, the front derailleur is more reliable because it does not have to deal with large changes in the chain angle due to excessive rear suspension movement, and the drive chain does not unexpectedly jump off of the front and/or rear sprockets due to excessive chain slack or angles.

There are many possible variations of this suspension system other than that which is shown by way of example in FIGS. 2 and 3. More particularly, the seat frame section 20 and the biasing means 60 can be made in other configurations without departing from the scope of the invention set forth in the claims. The seat and drive frame sections may each be molded from resin impregnated fibrous materials (such as fiberglass and/or carbon fiber composites) using the unitary molding methods and the materials described in U.S. Pat. No. 4,889,355, the entire contents of which are expressly incorporated herein by reference. The suspension system also may be used with molded one piece composite sections each of monocoque configuration with solid sides, in place of the tubular front and rear triangular sections 20 and 52.

It should also be apparent that the biasing means 60 can be a gas bag or bags as shown or made up of any number of other resilient materials commonly known in the biasing art. Furthermore, the biasing means 60 could be placed elsewhere on the frame. For example, biasing and preventing over extension of rear triangle 52 in accordance with the invention can be provided by other configurations using conventional biasing elements such as those mentioned below.

Figure 6:
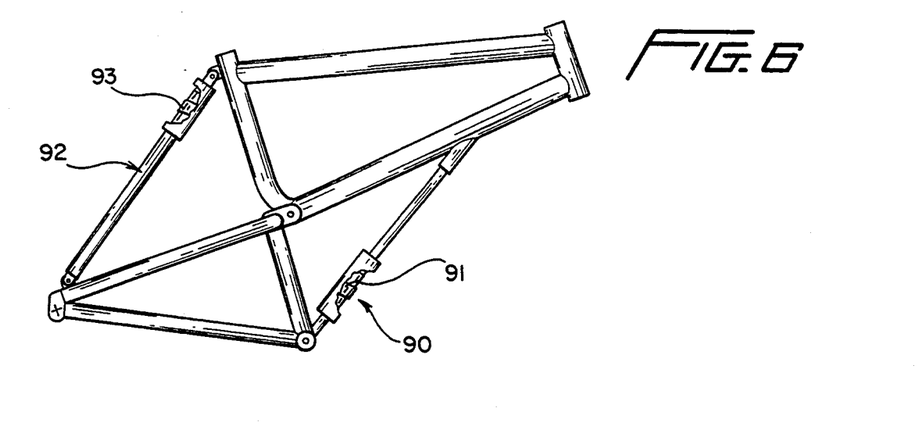
FIG. 6 is a right side elevational view of a modification of the invention with an elastomer spring arrangement shown in partial section.

FIG. 6 shows an embodiment wherein gas bag assembly 60 is replaced with a conventional elastomer spring 90, which includes an elastomer stack 91, and with an elastomer compression fork 92 that is connected to the outer ends of seat stays 68 and includes an elastomer stack 93. Elastomer compression fork 92 may have the same elements and functions in the same fashion as front fork 88.

Figure 7:
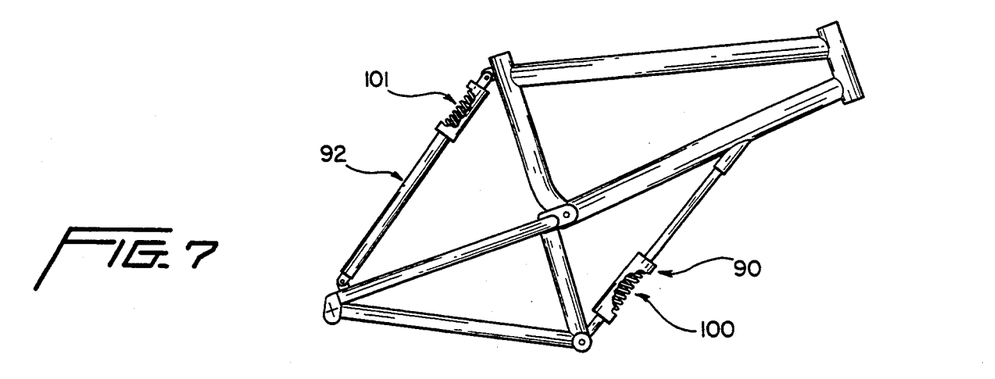
FIG. 7 is a right side elevational view of another modification of the invention with a steel coil spring arrangement shown in partial section.
Figure 8:
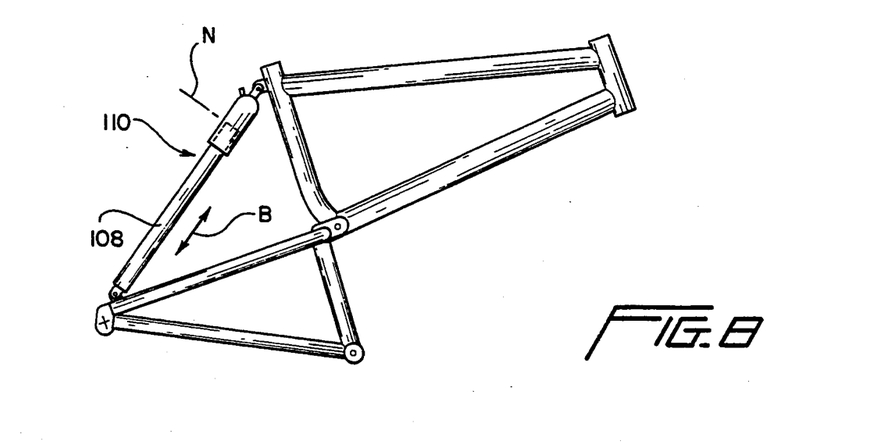
FIG. 8 is a right side elevational view of a further modification of the invention with a telescoping air and oil spring arrangement.

FIG. 7 shows the same arrangement as FIG. 6 with the elastomer stacks 91 and 93 replaced by metal coil springs 100 and 101, respectively. FIG. 8 shows a similar arrangement to that of FIG. 7 with metal coil springs 100 and 101 replaced by a single telescoping air spring and oil damper assembly 110, which is of conventional construction and may provide biasing forces in both directions as represented by arrow B upon movement of piston 108 to either side of a neutral position N, i.e., a tension force resists lengthening of the assembly and a compression force resists shortening of the assembly.

Having fully described preferred and other embodiments of the present invention, it will be apparent to those skilled in the art that numerous alternatives and equivalents exist which do not depart from the invention described above. For example, although the suspension system shown in the drawings is applied to bicycles, similar structures may be used for suspending one or more drive wheels for propelling tricycles and wheelchairs. It is therefore to be understood that the invention is not to be limited by the foregoing description but only by the appended claims.

What is claimed is:

1. A frame for a human powered vehicle, said frame comprising:

a drive frame section;

a seat frame section comprising means for supporting at least one seat on which a human being may sit, and means for supporting a first rotatable wheel so that it may engage a supporting surface;

pivot means for pivotally connecting said drive frame section to said seat frame section to provide pivotal movement therebetween about a pivot axis in response to the sitting of a human being on said seat; and, tension means connected between said seat frame section and said drive frame section for providing a tension force to resist said pivotal movement;

said drive frame section comprising:

a first portion including first means for securing said drive frame section to said pivot means, a second portion including second means for mounting a drive wheel assembly having at least one drive wheel adapted to engage said supporting surface and driven means actuatable by mechanical motion to cause said drive wheel to rotate about a rotational axis, and a third portion including third means for mounting driving means to which human power may be applied for causing transmission means to transmit said mechanical motion to said driven means such that said driven means causes said drive wheel rotation, said first, second and third portions of said drive frame section being connected together in a spatial relationship such that said pivotal movement causes said third means for mounting said driving means to move away from said means for supporting the first rotatable wheel;

and said tension means comprising a pressurizable gas bag, and opposing strap means for compressing said gas bag each connected between said seat frame section and said drive frame section such that said strap means are tensioned by said pivotal movement, said gas bag being positioned between said opposing strap means such that said gas bag is compressed by the tensioning of said strap means and said tension force is provided in response to gas pressure in said gas bag.

2. A vehicle frame according to claim 1 wherein said driving means comprises driving pulley means, wherein said driven means comprises driven pulley means, wherein said transmission means comprises a flexible driving element extending between and respectively engaged by said driving pulley means and said driven pulley means, wherein said flexible driving element has a tensioned run which drives said driven pulley means when human power is applied to a pedal component of said driving pulley means in a first direction causing a first torque around said pivot axis, and wherein said tensioned run extends from said driven pulley means to said driving pulley means in a second direction causing a second torque around said pivot axis which opposes said first torque so as to reduce a tendency of said drive frame section to pivot about said pivot axis in response to said application of human power.

3. A vehicle frame according to claim 1 wherein said driving means comprises driving pulley means, wherein said driven means comprises driven pulley means, wherein said transmission means comprises a flexible driving element extending between and respectively engaged by said driving pulley means and said driven pulley means, wherein said flexible driving element has a tensioned run which drives said driven pulley means when human power is applied to a pedal component of said driving pulley means forward of said pivot axis, wherein said first, second and third portions of said drive frame section are rigidly connected together in a triangular relationship in which at least a part of said driving means is positioned below a line extending through said pivot axis and said rotational axis when said first wheel and said drive wheel are in engagement with said supporting surface, and wherein said tensioned run is engaged by said driving pulley means at a position substantially below said line passing through said rotational axis and said pivot axis so as to reduce a tendency of said drive frame section to pivot about said pivot axis in response to said application of human power.

4. A vehicle frame according to claim 1 having stop means comprising a first stop element on said seat frame section and a second stop element on said drive frame section, said stop elements cooperating with each other to limit reverse pivotal movement opposite to said pivotal movement between said seat frame section and said drive frame section.

5. A vehicle frame according to claim 1 wherein said seat frame and drive frame sections are each made of a composite material comprising synthetic fibers impregnated with a synthetic resin, and are each molded as a single unitary piece.

6. A vehicle frame according to claim 1 wherein said opposing strap means are connected between said seat frame section and the third portion of said drive frame section.

7. A vehicle frame according to claim 7 wherein said frame means further comprises compression spring means connected between said seat frame section and the second portion of said drive frame section.

8. A vehicle frame according to claim 1 for a bicycle wherein said seat frame section comprises a top tube, a head tube, a down tube and a seat riser tube joined rigidly together; wherein said top tube has a front end connected to said head tube and a rear end connected to said seat riser tube; wherein said head tube includes means for providing a steering pivot for said first rotatable wheel; wherein said down tube has a first end connected to said head tube and a second end; wherein said seat riser tube has a bottom end and a top end; wherein said means for supporting at least one seat includes said top end, and said bottom end is joined to said down tube second end by a bottom junction; wherein said pivot means comprises first pivot means connected to said bottom junction and second pivot means connected to said drive frame section for providing a pivotable connection between said seat frame section and said drive frame section; wherein said drive frame section comprises a right chain stay and a left chain stay, a right dropout and a left dropout, a bottom bracket shell, a connector tube, and a right seat stay and a left seat stay; wherein said connector tube connects said bottom bracket shell to said second pivot means; wherein said right and left chain stays are located on opposites sides of a space for receiving a bicycle rear wheel and connect said right and left dropouts to said bottom bracket shell; wherein said right and left seat stays are located on opposite sides of said space for the bicycle rear wheel and connect said right and left dropouts to said second pivot means; wherein said tension means further comprises a first connector means and a second connector means, said first connector means being fastened to said seat frame section and said second connector means being fastened to said drive frame section; and wherein said seat frame section and said drive frame section are pivotally connected together by said first and second pivot means to move with respect to each other in a common plane, said movement being restricted by said tension means and enabling said bicycle frame to flex in response to irregularities in said supporting surface.

9. A vehicle frame according to claim 1 wherein said tension means includes means for adjusting a length dimension of each of said strap means.

10. A vehicle frame according to claim 1 wherein each of said opposing strap means comprises a strap member.

11. A vehicle according to claim 10 wherein each of said strap members is formed by a corresponding segment of a longitudinally continuous strap.

12. A frame for a human powered vehicle, said frame comprising:

a drive frame section comprising a right chain stay and a left chain stay, a right dropout and a left dropout, a bottom bracket shell, a connector tube, and a right seat stay and a left seat stay;

a seat frame section comprising a top tube, a head tube, a down tube and a seat riser tube joined rigidly together, means for supporting at least one seat on which a human being may sit, and means for supporting a first rotatable wheel so that it may engage a supporting surface;

pivot means for pivotally connecting said drive frame section to said seat frame section to provide pivotal movement therebetween about a pivot axis in response to the sitting of a human being on said seat; and, biasing means connected between said seat frame section and said drive frame section for providing a biasing force to resist said pivotal movement;

said drive frame section comprising:

a first portion including first means for securing said drive frame section to said pivot means, a second portion including second means for mounting a drive wheel assembly having at least one drive wheel adapted to engage said supporting surface and driven means actuatable by mechanical motion to cause said drive wheel to rotate about a rotational axis, and a third portion including third means for mounting driving means to which human power may be applied for causing transmission means to transmit said mechanical motion to said driven means such that said driven means causes said drive wheel rotation, said first, second and third portions of said drive frame section being rigidly connected together in a triangular relationship;

wherein said top tube has a front end connected to said head tube and a rear end connected to said seat riser tube;

wherein said head tube includes means for providing a steering pivot for said first rotatable wheel;

wherein said down tube has a first end connected to said head tube and a second end;

wherein said seat riser tube has a bottom end and a top end;

wherein said means for supporting at least one seat includes said top end, and said bottom end is joined to said down tube second end by a bottom junction;

wherein said pivot means comprises first pivot means connected to said bottom junction and second pivot means connected to said drive frame section for providing a pivotable connection between said seat frame section and said drive frame section;

wherein said connector tube connects said bottom bracket shell to said second pivot means;

wherein said right and left chain stays are located on opposites sides of a space for receiving a bicycle rear wheel and connect said right and left dropouts to said bottom bracket shell;

wherein said right and left seat stays are located on opposite sides of said space for the bicycle rear wheel and connect said right and left dropouts to said second pivot means;

wherein said biasing means has a first connector means and a second connector means, said first connector means being fastened to said seat frame section and said second connector means being fastened to said drive frame section; and, wherein said seat frame section and said drive frame section are pivotally connected together by said first and second pivot means to move with respect to each other in a common plane, said movement being restricted by said biasing means and enabling said bicycle frame to flex in response to irregularities in said supporting surface.

13. A vehicle frame according to claim 12 wherein said triangular relationship is such that said pivotal movement causes said third means for mounting said driving means to move away from said means for supporting the first rotatable wheel, and said biasing force is a tension force for resisting said pivotal movement; and wherein said biasing means comprises a pressurizable gas bag connected between said seat frame section and the third portion of said drive frame section, and connecting means for connecting said gas bag between said seat frame section and said drive frame section, said connecting means being arranged to be tensioned by said pivotal movement and to compress said gas bag when tensioned such that said tension force is provided in response to gas pressure in said gas bag.

14. A vehicle according to claim 13 wherein said connecting means comprises opposing strap means each having a first end connected to said seat frame section and a second end connected to said drive frame section such that said strap means are tensioned by the pivotal movement causing said third means for mounting said driving means to move away from said means for supporting the first rotatable wheel, and wherein said gas bag is positioned between said opposing strap means such that the gas bag is compressed by said tensioning of the strap means.

15. A vehicle frame according to claim 13 wherein said biasing means further comprises compression spring means connected between said seat frame section and the second portion of said drive frame section.

16. A vehicle frame according to claim 12 wherein said biasing means comprises compression spring means connected between said seat frame section and the second portion of said drive frame section.

17. A vehicle frame according to claim 12 wherein said seat frame and drive frame sections are each made of a composite material comprising synthetic fibers impregnated with a synthetic resin, and are each molded as a single unitary piece.

18. A vehicle frame according to claim 12 wherein said biasing means includes means for adjusting said biasing force.

19. A frame for a bicycle, said frame comprising:
a drive frame section;
a seat frame section comprising means for supporting at least one seat on which a human being may sit, and means for supporting a first rotatable wheel so that it may engage a supporting surface;
pivot means for pivotally connecting said drive frame section to said seat frame section to provide pivotal movement therebetween about a pivot axis in response to the sitting of a human being on said seat; and,
tension means connected between said seat frame section and said drive frame section for providing a tension force to resist said pivotal movement;
said drive frame section comprising:
a first portion including first means for securing said drive frame section to said pivot means,
a second portion including second means for mounting a drive wheel assembly having at least one drive wheel adapted to engage said supporting surface and driven means actuatable by mechanical motion to cause said drive wheel to rotate about a rotational axis,
and a third portion including third means for mounting driving means to which human power may be applied for causing transmission means to transmit said mechanical motion to said driven means such that said driven means causes said drive wheel rotation, said first, second and third portions of said drive frame section being connected together in a spatial relationship such that said pivotal movement causes said third means for mounting said driving means to move away from said means for supporting the first rotatable wheel;
wherein said tension means comprises a pressurizable gas bag, and connecting means for connecting said gas bag between said seat frame section and said drive frame section;
wherein said connecting means is arranged to be tensioned by said pivotal movement and to compress said gas bag when tensioned such that said tension force is provided in response to gas pressure in said gas bag;
wherein said seat frame section comprises a top tube, a head tube, a down tube and a seat riser tube joined rigidly together, said top tube having a front end connected to said head tube and a rear end connected to said seat riser tube, said head tube including means for providing a steering pivot for said first rotatable wheel, said down tube having a first end connected to said head tube and a second end, and said seat riser tube having a bottom end and a top end;
wherein said means for supporting at least one seat includes said top end, said bottom end being joined to said down tube second end by a bottom junction, and said pivot means comprising first pivot means connected to said bottom junction and second pivot means connected to said drive frame section for providing a pivotable connection between said seat frame section and said drive frame section;
wherein said drive frame section comprises a right chain stay and a left chain stay, a right dropout and a left dropout, a bottom bracket shell, a connector tube, and a right seat stay and a left seat stay, said connector tube connecting said bottom bracket shell to said second pivot means;
wherein said right and left chain stays are located on opposites sides of a space for receiving a bicycle rear wheel and connect said right and left dropouts to said bottom bracket shell, said right and left seat stays being located on opposite sides of said space for the bicycle rear wheel and connecting said right and left dropouts to said second pivot means; and,
wherein said tension means has a first connector and a second connector, said first connector being fastened to said seat frame section and said second connector being fastened to said drive frame section, said seat frame section and said drive frame section being pivotally connected together by said first and second pivot means to move with respect to each other in a common plane, and said movement being restricted by said tension means and enabling said bicycle frame to flex in response to irregularities in said supporting surface.

20. A bicycle frame according to claim 19 wherein said connecting means is connected between said seat frame section and the third portion of said drive frame section.

21. A bicycle frame according to claim 20 wherein said frame further comprises compression spring means connected between said seat frame section and the second portion of said drive frame section.

22. A bicycle frame according to claim 19 wherein at least one of siad first and second connector means includes means for adjusting a length dimension of said tension means.

* * * * *